United States Patent [19]
Jones et al.

[11] Patent Number: 5,257,017
[45] Date of Patent: Oct. 26, 1993

[54] ELECTRONIC BILLBOARD

[76] Inventors: Bruce Jones, c/o Universal Advancement Inc. P.O. Box 1148, Elizabeth, N.J. 07207; George Spector, 233 Broadway Rm 702, New York, N.Y. 10279

[21] Appl. No.: 843,270

[22] Filed: Feb. 27, 1992

[51] Int. Cl.⁵ ............................................. G09G 1/08
[52] U.S. Cl. ..................................... 345/13; 358/252; 358/231; 345/10
[58] Field of Search ............... 340/795, 794, 766, 736, 340/815.17, 815.18, 815.08, 815.07, 815.09, 810, 809; 358/231, 237, 60, 251

[56] References Cited

U.S. PATENT DOCUMENTS

| | | | |
|---|---|---|---|
| 2,779,938 | 1/1957 | Pifer | 358/252 |
| 3,560,649 | 2/1971 | Anderson | 358/231 |
| 3,728,711 | 4/1973 | Adkins | 340/736 |
| 3,930,251 | 12/1975 | Salava et al. | 340/795 |
| 3,967,265 | 6/1976 | Jacob | 340/795 |

*Primary Examiner*—Tommy P. Chin
*Assistant Examiner*—A. Au

[57] ABSTRACT

An electronic billboard sign is provided in which electro-micro circuitry programming is utilized to display advertising information onto a large front billboard screen by a large moveable lens.

2 Claims, 1 Drawing Sheet

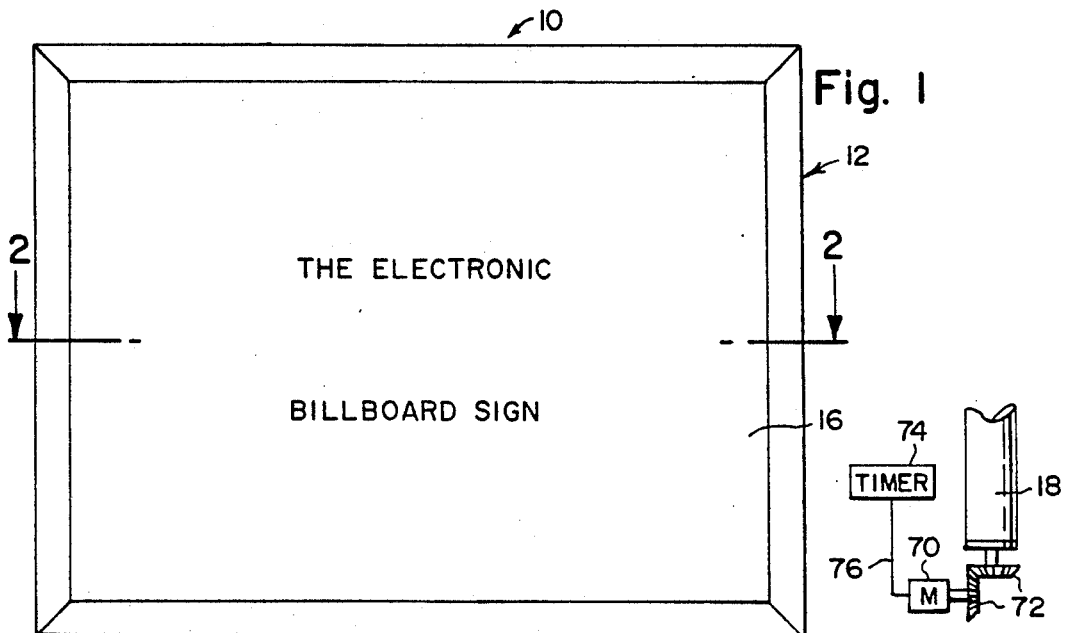
Fig. 1
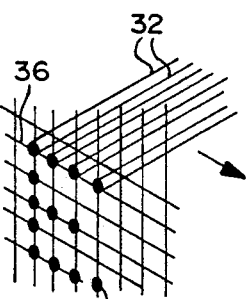
Fig. 4
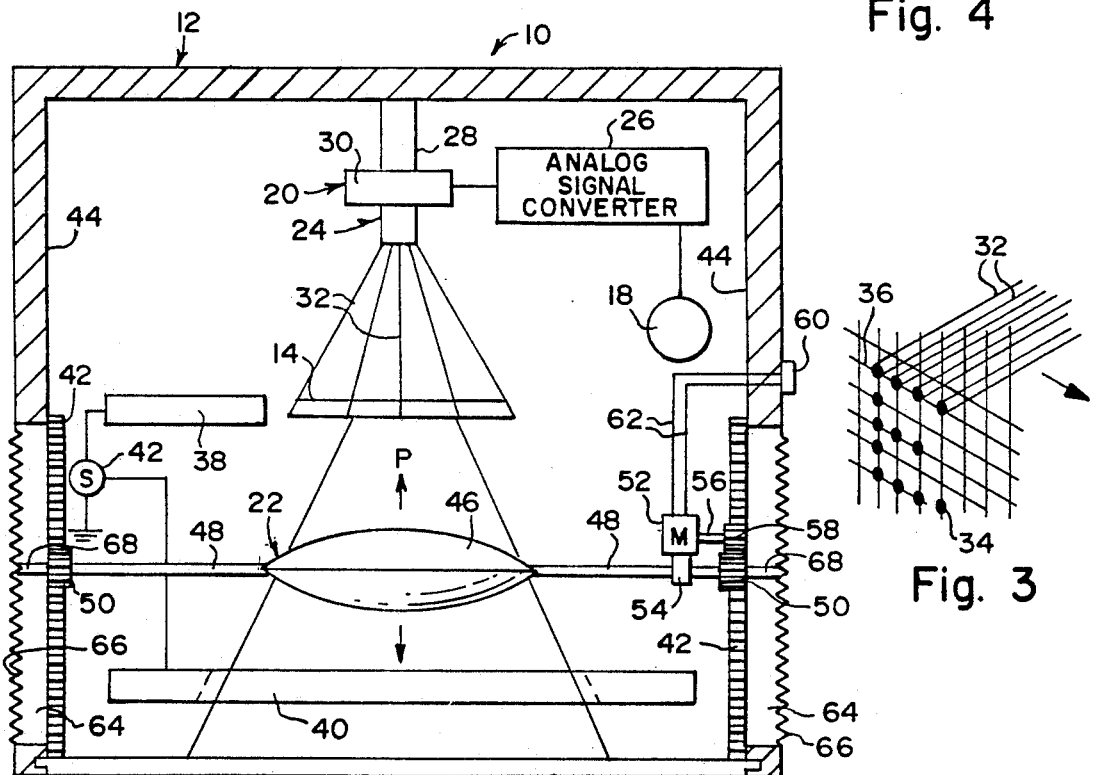
Fig. 2
Fig. 3

ELECTRONIC BILLBOARD

BACKGROUND OF THE INVENTION

The instant invention relates generally to signs and more specifically it relates to an electronic billboard sign.

Numerous signs have been provided in prior art that are adapted to be illuminated and of the changable variety used for outdoor advertising. For example, U.S. Pat. Nos. 2,120,259; 2,925,676 and 3,373,517 all are illustrative of such prior art. While these units may be suitable for the particular purpose to which they address, they would not be as suitable for the purposes of the present invention as heretofore described.

SUMMARY OF THE INVENTION

A primary object of the present invention is to provide an electronic billboard sign that will overcome the shortcomings of the prior art devices.

Another object is to provide an electronic billboard sign in which electro-micro circuity programming is utilized to display advertisements onto a large front billboard screen.

An additional object is to provide an electronic billboard sign in which a large moveable lens is utilized to increase the size of the advertisements onto a large billboard screen.

A further object is to provide an electronic billboard sign that is simple and easy to use.

A still further object is to provide an electronic billboard sign that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a front view of the invention looking at the billboard screen.

FIG. 2 is a cross sectional view shown partly diagrammatically and taken along line 2—2 in FIG. 1 illustrating the internal structure therein.

FIG. 3 is an enlarged perspective view of part of the display screen showing the screen coordinate system.

FIG. 4 is a diagrammatic view of the mechanical system for operating the cartridge.

DETAILED DESCRIPTION OF THE PREFERRED EMBODIMENTS

Turning now descriptively to the drawings, in which similar reference characters denote similar elements throughout the several views, FIGS. 1 and 2 illustrate an electronic billboard sign 10 consisting of a housing 12 that has an interior display screen 14 and a large front billboard screen 16. An electronic cartridge 18 that has advertising information therein is disposed within the housing 12. An electronic visual system 20 is for transferring the advertising information from the cartridge 18 to the interior display screen 14 in the form of images. A device 22 is provided for enlarging and transferring the images from the interior display screen 14 to the large front billboard screen 16 for viewing.

The electronic visual system 20 includes a visual display unit 24 consisting of an analog signal convertor 26 for receiving the advertising information from the cartridge 18 and an electron gun 28 that has a deflection yoke 30 for receiving the advertising information from the convertor 26 and sending a scanning electron beam 32 to the interior display screen 14.

The interior display screen 14, as best shown in FIG. 3, includes a plurality of microdots 34 which are activated in grid patterns 36 by the scanning electron beam 32 from the electron gun 28 to form the images. A first screen lamp 38 is for supplying light onto the microdots 34 which will light up when activated by the scanning electron beam 32 from the electron gun 28. A second screen lamp 40 is for supplying light onto the large front billboard screen 16 which will light up the advertising information to be viewed therefrom. A switch 42 is for varying the amount of light from the screen lamps 38 and 40 to compensate for degree of surrounding brightness on the interior display screen 24 and the large front billboard screen 16.

The enlarging and transferring device 22 includes a pair of horizontal gear tracks 42, each of which is formed on an opposite interior side wall 44 of the housing 12. A large lens 46 has a support arm 48 extending from each side thereof. A pair of gears 50 are each freely rotatably disposed on one end of the support arm 48 to travel along one of the gear tracks 42. A motor 52 is connected with bracket 54 to the support arm 48. The motor 52 has a shaft 56 with gear drive 58 thereon. The gear drive 58 is in cooperation with one of the gears 50 on the support arm 48. A control knob 60 is electrically connected at 62 to the motor 52 so as to operate the shaft 56. The housing 12 has an elongated slots 64 in each of the side walls 44 adjacent each of the gear tracks 42. A scale 66 is on exterior of each of the side walls 44 along each of the elongated slots 64. A pointer 68 extends from each end of the support arm 48 through each of the slots 64 to indicate amount of movement of the support arm 48 with respect to the scales 66.

FIG. 4 shows a cartridge motor 70 that has a drive gear system 72 for operating the cartridge 18. A timer 74 is electrically connected at 76 to the cartridge motor 70 for operating the cartridge motor through predetermined time intervals so that various advertising information can be extracted from the cartridge 18 for viewing.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An electronic billboard sign which comprises:
   a) a housing having an interior display screen and a large front billboard screen;
   b) an electronic cartridge having advertising information therein, said cartridge disposed within said housing;
   c) an electronic visual means for transferring the advertising information from said cartridge to the interior display screen in the form of images;
   d) means for enlarging and transferring the images from the interior display screen to the large front billboard screen for viewing, wherein said electronic visual means includes a visual display unit comprising:

e) an analog signal convertor for receiving the advertising information from said cartridge;

f) an electron gun having a deflecting yoke for receiving the advertising information from said convertor and sending a scanning electron beam to the interior display screen;

g) the interior display screen including a plurality of microdots which are activated in grid patterns by the scanning electron beam from said electron gun to form the images;

h) a first screen lamp for supplying light onto the microdots which will light up when activated by the scanning electron beam from said electron gun;

i) a second screen lamp for supplying light onto the large front billboard screen which will light up the advertising information to be viewed therefrom; and j) a switch for varying amount of light from said screen lamps to compensate for degree of surrounding brightness on the interior display screen and the large front billboard screen, wherein said enlarging and transferring means includes;

k) a pair of horizontal gear tracks, each formed on an opposite interior side wall of said housing;

l) a large lens having a support arm extending from each side thereof;

m) a pair of gears, each freely rotatably disposed on one end of the support arm to travel along one of said gear tracks;

n) a motor connected to the support arm, said motor having a shaft with gear drive thereon, the gear drive in cooperation with one of said gears on the support arm;

o) a control knob electrically connected to said motor motor so as to operate the shaft;

p) said housing having elongated slot in each of the side walls adjacent each of said gear tracks;

q) a scale on exterior of each of the side walls along each of the elongated slots; and r) a pointer extending from each end of the support arm through each of the slots to indicate amount of movement of the support arm with respect to said scales.

2. An electronic billboard sign as recited in claim 1, further comprising:

a) a cartridge motor having a drive gear system for operating said cartridge; and b) a timer electrically connected to said cartridge motor for operating said cartridge motor through predetermined time intervals so that various advertising information can be extracted from said cartridge for viewing.

* * * * *